2 Sheets. Sheet 1.

S. D. Tucker,
Mach. for Grinding Circular Saws.
N°. 84,721. Patented Dec. 8. 1868.

Witnesses:
Wm. W. Anderson Jr.
Edward E. Osborn

Inventor,
Stephen D. Tucker

N. PETERS, PHOTO-LITHOGRAPHER, WASHINGTON, D.C.

2 Sheets, Sheet 2
S. D. Tucker,
Mach. for Grinding Circular Saws.
N°. 84,721.      Patented Dec. 8, 1868.
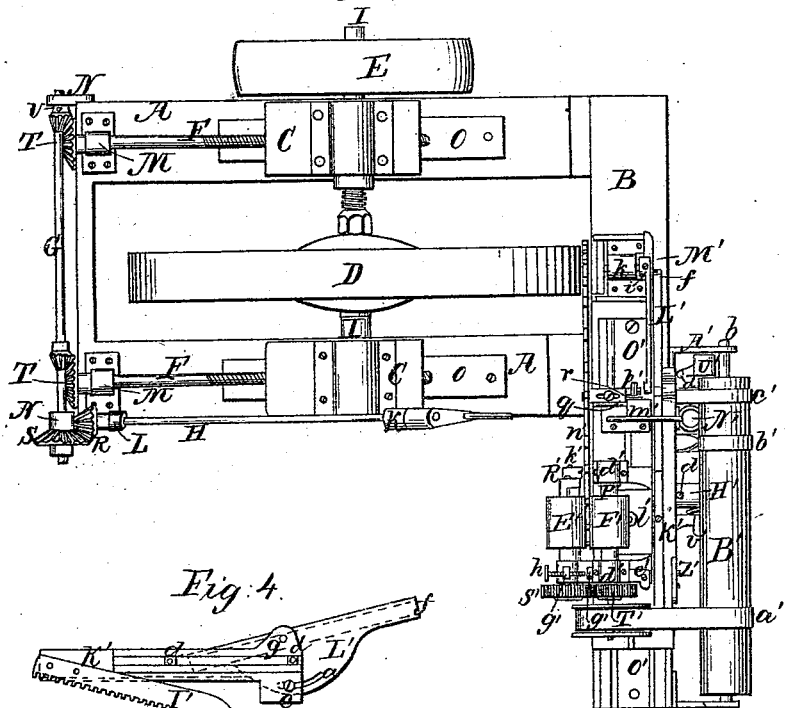
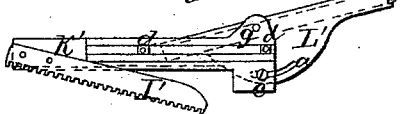
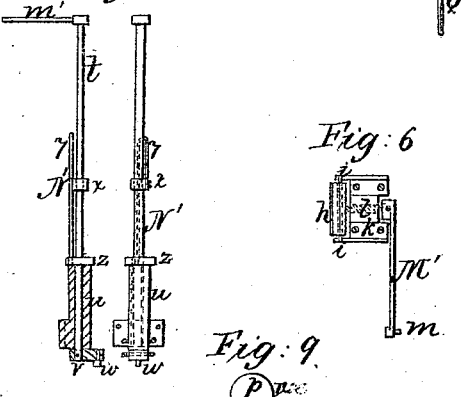
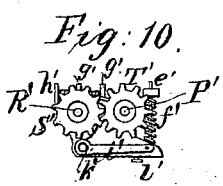
Witnesses,
Wm W. Anderson Jr
Edward E. Osborn
Inventor,
Stephen D. Tucker

STEPHEN D. TUCKER, OF NEW YORK, N. Y.

Letters Patent No. 84,721, dated December 8, 1868.

IMPROVEMENT IN MACHINE FOR GRINDING CIRCULAR SAWS.

The Schedule referred to in these Letters Patent and making part of the same.

*To all whom it may concern:*

Be it known that I, STEPHEN D. TUCKER, of the city, county, and State of New York, have invented a new and useful Improvement in Machines for Grinding Circular Saws; and I do hereby declare the following to be a full, clear, and exact description thereof, reference being made to the accompanying drawings, and the figures and letters of reference thereon, making part of this specification.

Of the said drawings—

Figure 3 is a top view;

Figure 4 is a side view of the carriage and its rack;

Figures 5 and 6 are views in detail of the movable saw-rest;

Figure 7 is a view of the reversing-rod;

Figures 8 and 9 are views of the adjustable arbor; and

Figure 10 is a view of the feed-roller gears.

Similar letters of reference indicate like parts in the several drawings.

My invention consists—

Figure 1:
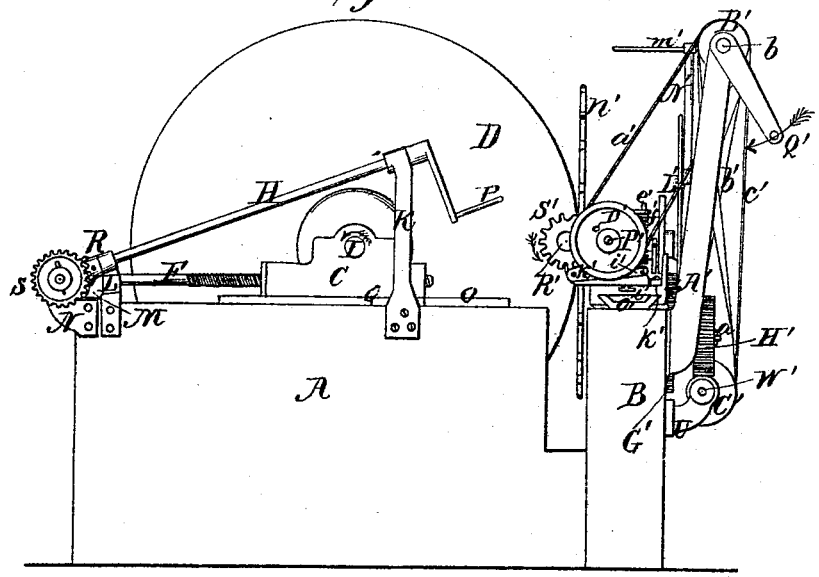
Figure 1 is a front view of the machine.
Figure 2:
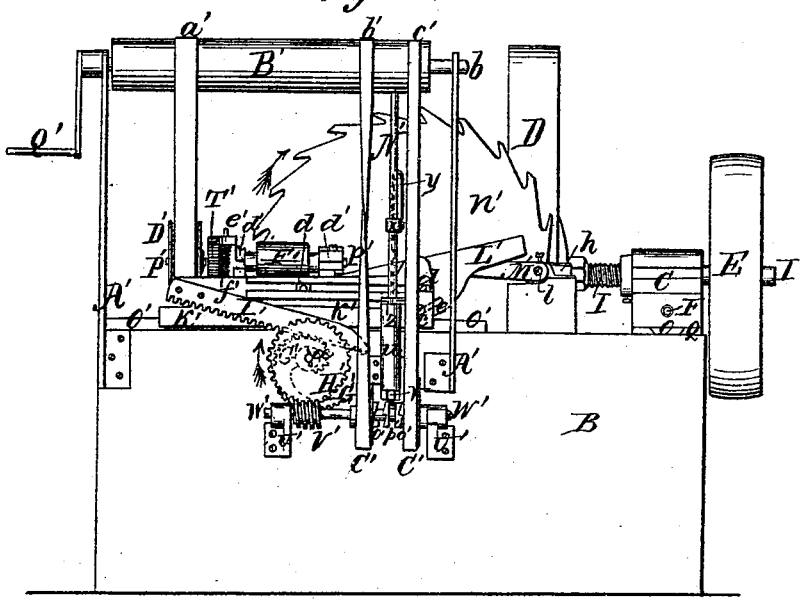
Figure 2 is a side view.

First, in making the head which supports the feed-rollers adjustable on the carriage, whereby the machine can be readily adjusted to grind saws of any diameter.

Second, in the arrangement of a movable rest to support the saw at the point of grinding.

Third, in a mechanism for automatically grinding saws, either parallel, concave, or convex, as may be desired.

Fourth, in a mechanism for moving the carriage that supports and moves the saw automatically in both directions.

Fifth, in a mechanism for reversing the travel of the carriage.

Sixth, in a mechanism for giving a differential motion to the carriage.

Seventh, in the use of a circular arbor or bearing for the saw, so constructed as to permit the centre of the saw to advance to the edge of the grindstone.

To enable others skilled in the art to make and use my invention, I will describe its construction and operation.

The carriage and its mechanism, as well as the grindstone and its appurtenances, are secured to and supported by the frame A A B.

The journal-blocks C C, which support the ends of the shaft, I, of the grindstone, are arranged to move on the slides O O, that are secured on the frame.

F F are two screw-rods, which work in screw-holes in the journal-blocks, and which are attached to the bevel-gears T T. The gears mesh with the pinions U U on the shaft G, and have a uniform motion.

The shaft G is supported by the two brackets N N on the end of the frame; and on the front end of this shaft there is a bevel-gear, S, which meshes with the pinion R on the inclined shaft H.

This shaft H is supported by the standards K L, and has a handle, P, secured on its upper end.

As the handle P is turned, the stone D is moved either toward or away from the saw, through the medium of the rods F G H and the gears R S T U.

The stone D is driven by the band-wheel E, secured to the end of the shaft I.

The adjustable head that holds the rollers E' F', and the arbor q that supports the saw at its centre, are secured to the carriage K'.

The ways O', on which the carriage travels, are secured on the frame B.

The two rollers E' F', which impart a rotary motion to the saw, are geared together, and motion is given to these gears S' T' by means of the pulley D', secured on the shaft P'. This pulley is driven by the belt $a'$ on the drum B'.

To allow for the admission of saws of different thickness, the roller E' is made movable with regard to the roller F', and the means for operating the same consist of the L-shaped lever $i'$, pivoted at $b'$, which forms, at its upper end, a bearing for one end of the shaft R', an ear, $g'$, threaded for the passage of the set-screw $h'$, (whose point works against the projection $g'$ on the stationary bearing, $d'$, of the shaft P',) and the coil-spring $f'$, on the rod $e'$, which acts on the lower end of the lever $i'$, with a tendency to press the two rollers strongly together and gripe the saw.

When it is desired to admit or remove a saw, the pressure of the spring is counteracted and the rollers readily separated by means of the set-screw $h'$, which works against the stationary projection $g'$.

The head carrying the rollers is adjusted on the carriage by means of the clamp and screw $l'$, which works in the T-shaped slot in the carriage, so that the distance between the centre or bearing of the saw and the rollers can be readily adjusted.

The arbor or bearing for the saw is formed with a centre-pin, $p$, to which the cap $o$ is secured by the screw $n$. This cap $o$, when the saw is in place on the pin $p$, is turned half way around, and held by the screw $n$, to hold the saw securely in its place on the arbor, and permit the centre of the saw to advance to the edge of the grindstone.

The mechanism for giving a parallel, concave, or convex surface to the face of the saw, consists of a movable rest, $h$, pivoted at $i$, and held against the end of the screw $l$, which works in the bearing $k$, and is secured to the arm M' by the pressure of the coil-spring $o'$ against the lower end of the rest $h$.

The movement of the rest $h$ is controlled by the adjustable guide L', which is pivoted to the carriage K', at $g$, and adjusted by the slot $e$ and screw $c$.

This guide L' has a groove, (shown by the dotted lines at $f$, fig. 4,) in which the pin $m$, on the arm M', works, so that when the carriage moves forward or backward, the arm M' is raised or depressed, or remains stationary, as the case may be, and the rest is consequently pressed against or withdrawn from the surface of the saw that is interposed between it and the face of the grindstone in a regular and uniform manner, or it remains stationary.

The movement of the rest is effected through the medium of the screw $l$, attached to the arm M', and as the arm is raised or lowered, the screw is thrown against or drawn away from the rest.

On the side of the carriage K' there is secured an inclined rack, I', the teeth of which are in gear with the scroll-gear G'.

The worm-wheel H', which works on the same shaft with the scroll-gear G', is actuated by the worm V' on the shaft W'.

On this shaft, whose bearings are at U' U', are placed two loose pulleys, C' C', one turning in opposite direction from the other, and between them is a sliding clutch, $p'$, which turns with the shaft W', and is arranged to engage with the clutches $o'$ $o'$ on the loose pulleys C' C', so that the motion of the pulley with which the clutch $p'$ is engaged is imparted to the shaft W'.

N' is a rod, passing through the hollow standard $u$, bolted to the frame B, with its several parts so arranged as to constitute a reversing-mechanism for the carriage. The lower end of this rod is secured to the crank or small arm $v$, in the end of which there is a pin, $w$. This pin fits in a groove in the clutch $p'$, so that when the rod is turned, the clutch $p'$ is caused to move on the shaft W'; and in the upper end of the rod there is a handle, $m'$, for the purpose of enabling the clutch to be operated by hand, if required.

The collar $z$ is fast on the rod, and turns with it, and in this collar there is cut a slot to receive the end of the spring $y$. The upper end of this spring is fastened to the rod by the collar $x$.

The spring $y$, when in place, is on a line with and between the two adjustable stops $d$ $d$ in the groove on the side of the carriage K'.

The drum B', by which motion is imparted to the several pulleys, has its bearings at $b$ $b$, and is made of sufficient length to allow for the travel of the belt $a'$.

The several parts of the machine being properly adjusted, and the saw to be ground placed and secured upon its arbor, the operation will be as follows:

The stone D is brought up against the face of the saw by turning the handle P, the movable rest $h$ is adjusted to be in line with the face of the roller F', and the coiled spring $f'$ is compressed so as to press the rollers E' and F' sufficiently hard against the saw to drive it. Motion is then applied to the pulley E and drum B'.

As the pulley with which the clutch $p'$ is engaged is rotated by the band $c$, the carriage is moved forward with a differential motion, caused by the peculiar form of the scroll-gear G', and the saw advanced in a positive manner, between the rest $h$ and the face of the grindstone, until the stop $d$ is brought in contact with the spring $y$ of the reversing-rod N'.

The pressure of the stop against the spring compresses it, and causes the arm $v$ to turn and throw the clutch $p'$ in contact with the pulley, which is rotated in the opposite direction by the crossed belt $b'$. This imparts a reverse movement to the shaft W', and the carriage is moved backward until the other stop is brought against the spring, when the clutch is again disengaged from the second pulley and re-engaged with the first one.

The movement of the carriage is thus controlled automatically, and its extent of travel is regulated by the distance which the two stops are adjusted from each other.

By this means a reciprocating movement is given to the saw, while at the same time a rotary motion is given it by the rollers E' F'.

By examining the drawings, it will be perceived that a greater or less inclination of the guide L', which governs the motions of the arm M', will cause the rest $h$, in like proportion, to advance and recede from the grindstone.

If the guide L', in the drawings, were set with its groove on a horizontal line, the arm M' would have no motion, and the rest $h$ would be pressed uniformly against the saw, and its surface would be ground plane or of a uniform thickness; but as the guide is set in the drawings, the arm M' is raised as the carriage is drawn back, and the rest $h$ is advanced toward the grindstone as the periphery of the saw approaches it, so that its surface will be ground of a convex form, or of greater thickness at the centre than at the periphery of the saw.

The inclination of the guide L' being reversed, the rest will advance as the centre of the saw approaches it, and the saw will be ground with a concave surface.

Having thus fully described my invention,
I claim—

1. Making the head adjustable on the carriage K, in combination with the rollers E' F', for driving the saw, whereby the machine can be readily adjusted to grind saws of any diameter, substantially as described and specified.

2. The movable rest $h$, for holding the saw at the point of grinding, whereby the saw may be automatically ground of a concave, convex, or plane surface, substantially as described and specified.

3. The rest $h$, screw $l$, provided with its arm M' and the grooved and slotted guide L', pivoted to the carriage, substantially as described, and for the purpose specified.

4. The combination and arrangement of the clutch $p'$, pulleys C' C', the worm V', on the shaft W', upright shaft N', with its spring $y$, and the adjustable stops $d$ $d$ on the carriage, for operating the carriage in both directions automatically, substantially as described and specified.

5. The rod N', provided with the arm $v$ and pin $w$, clutch $p'$, and adjustable stops $d$ $d$ on the carriage for reversing the travel of the carriage, substantially as described and specified.

6. The scroll-gear G' and inclined rack I', on the carriage, for giving a differential movement to the carriage, substantially as described and specified.

7. The arbor or bearing $q$, centre-pin $p$, and cap $o$, substantially as described and specified.

STEPHEN D. TUCKER.

Witnesses:
WM. M. ANDERSON, Jr.,
EDWARD E. OSBORN.